E. I. DODDS.
APPARATUS FOR TESTING CASTINGS.
APPLICATION FILED APR. 11, 1913.

1,096,159.

Patented May 12, 1914.

WITNESSES
R. A. Balderson
G. B. Fleming

INVENTOR
E. I. Dodds,
by Bakewell, Byrnes r Parmelee
Attys.

UNITED STATES PATENT OFFICE.

ETHAN I. DODDS, OF CENTRAL VALLEY, NEW YORK.

APPARATUS FOR TESTING CASTINGS.

1,096,159. Specification of Letters Patent. Patented May 12, 1914.

Application filed April 11, 1913. Serial No. 760,473.

*To all whom it may concern:*

Be it known that I, ETHAN I. DODDS, a citizen of the United States, and a resident of Central Valley, in the county of Orange and State of New York, have invented a new and useful Improvement in Apparatus for Testing Castings, of which the following is a full, clear, and exact description, reference being had to the accompanying drawings, forming part of this specification, in which—

Figure 1:
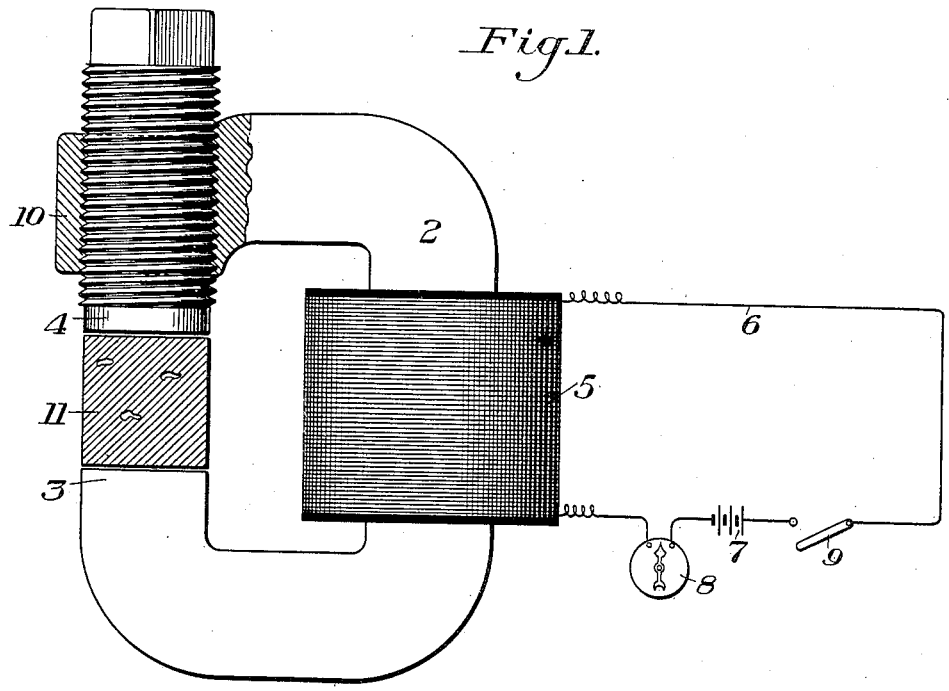
Figure 2:
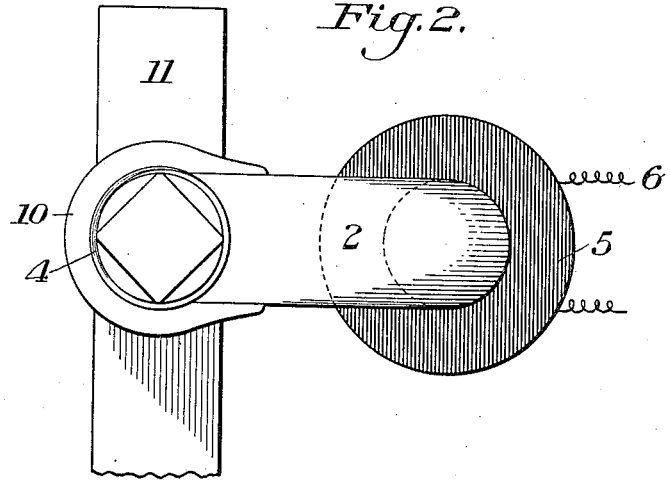

Figure 1 is a side elevation of one form of apparatus for carrying out my invention, the electrical connections being shown diagrammatically; and Fig. 2 is a plan view of the apparatus.

This invention relates to apparatus for testing castings, and is designed to provide a simple and reliable apparatus for testing iron and steel castings, or other metal pieces of magnetic material.

My invention provides means whereby any defects in castings, such as blow-holes, sand-holes or cracks, may be located by passing the casting through the gap in a magnetic field, so that the casting will form a part of the magnetic path. This magnetic field may be generated by means of an electric circuit having connected therein a sensitive instrument of any well known character which will indicate the strength of the current passing through it, and any slight variations therein. Flaws or defects in the casting cause a variation in the lines of force passing through this magnetic circuit, and these in turn cause variations or fluctuations in the electric current which are indicated by the sensitive instrument in the circuit.

The precise nature of my invention will be best understood by reference to the accompanying drawings, which will now be described, it being premised, however, that various changes may be made in the details of construction and arrangement of parts without departing from the spirit and scope of my invention as defined in the appended claims.

In Figs. 1 and 2 of the drawings, the numeral 2 designates the core of an electro-magnet having the poles 3 and 4.

5 is a coil surrounding the body portion of the core. This coil is connected in series in an electric circuit 6, which in this case derives its current from the battery 7.

8 is a galvanometer, or other sensitive instrument connected in series in the circuit, and which will indicate the current passing through the circuit. 9 is a hand switch in said circuit, which may be opened and closed at will.

The core 2 is composed of any well known material which will be magnetized when a current is passed through its energy coil, and is of substantially the same cross-section throughout its length. The pole-piece 3 is formed integrally with the core 2, while the pole-piece 4 is formed by a screw, the end of which is turned to the same cross-section as the end of the pole 3, and which is seated in a screw threaded orifice in the end of the core 2. This end of the core is composed of magnetic and non-magnetic material. As shown in Fig. 2, the magnetic material extends to the movable pole piece 4, and secured to this end of the core 2 and surrounding the movable pole piece 4, is a strap 10 composed of non-magnetic material such as brass or copper.

11 designates the piece to be tested to discover whether there are any flaws or blow-holes therein, and this is done in the following manner: The switch 9 is closed and the current from the battery 7 passes through the coil 5 and the instrument 8. This generates a magnetic flux in the core of the magnet, the magnetic lines of force flowing from one pole piece to the other. The casting 11 is placed between the pole piece, and the reading of the instrument is noted. The casting is now moved along between the pole pieces, and if there are any cracks, blows-holes or sand-holes therein, the number of lines of force passing through the casting at this point will be reduced, causing a variation in the current passing through the coil 5, and such variation is indicated by the instrument 8. This variation is in proportion to the variation of the number of lines of force passing through the casting 11, or from pole to pole of the core.

Castings of various thickness may be tested by this instrument, by raising or lowering the movable pole piece to adjust the pole pieces with relation to each other, and since the sectional area of the core 2 and the pole piece is the same throughout their lengths, this adjustment will always cause the same number of lines of force to pass from pole to pole, providing the same amount of space is provided between the casting and the pole pieces.

This instrument may be used for testing castings immediately after they are taken from the sand, or the scale may be removed from both sides thereof before they are tested.

It is well known to those skilled in the art, that quite frequently a casting is finished and no defects are shown on the finished face thereof, but after it has been put into use, it will break due to an internal crack or some other defect such as a blow-hole or sand-hole below the surface of the casting which materially weakens it. By the use of the instrument described, these flaws can readily be detected before the casting is finished and put into use, thereby saving much work, as well as avoiding serious accidents resulting from the defects.

This application is for a portion of the invention disclosed in my earlier application Serial No. 510,158, filed July 29, 1909.

I claim:

1. An instrument for testing castings, comprising an electromagnet having a core and separated poles, said separated poles forming an air gap through which the piece to be tested is passed, one of said poles being adjustable toward and away from the other pole, an energizing circuit for the magnet, and an indicating instrument in such circuit, to indicate the magnetic lines of force passing from pole to pole through said piece; substantially as described.

2. An instrument for testing castings, comprising an electromagnet having a core and separated poles, said separated poles forming an air gap through which the piece to be tested is passed, one of said poles having a screw threaded engagement with the core to permit said core to be adjusted toward and away from the other pole to vary the size of the gap through which the piece to be tested is passed, and a sensitive instrument in the energizing circuit of the magnet; substantially as described.

In testimony whereof, I have hereunto set my hand.

ETHAN I. DODDS.

Witnesses:
   GEO. B. BLEMING,
   JESSE B. HELLER.